J. C. LIGGETT.
MACHINE FOR EXTRACTING JUICE FROM FRUIT.
APPLICATION FILED MAY 8, 1916.

1,401,416.

Patented Dec. 27, 1921.
3 SHEETS—SHEET 1.

Inventor:
John C. Liggett,
by [signature]
Attys.

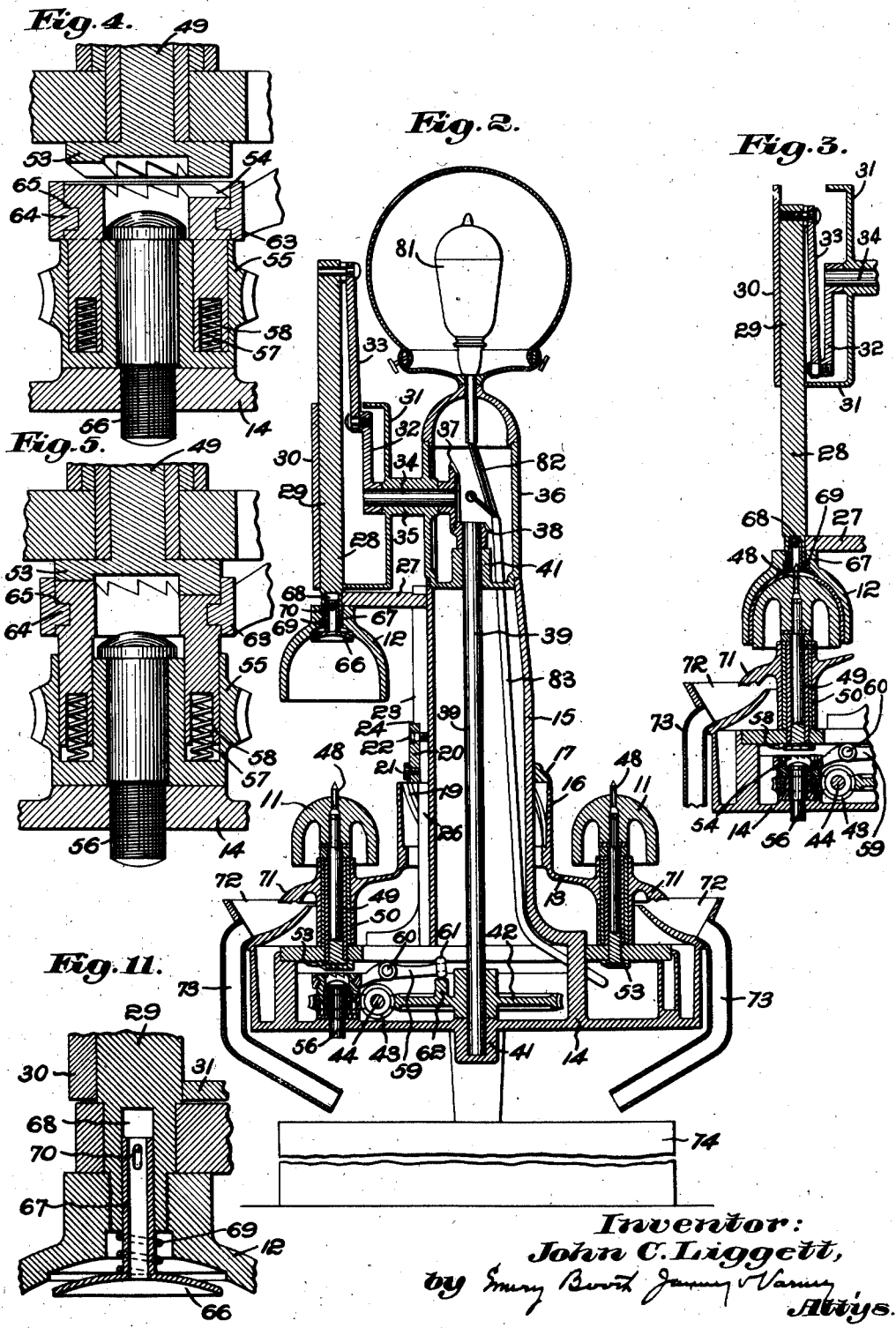

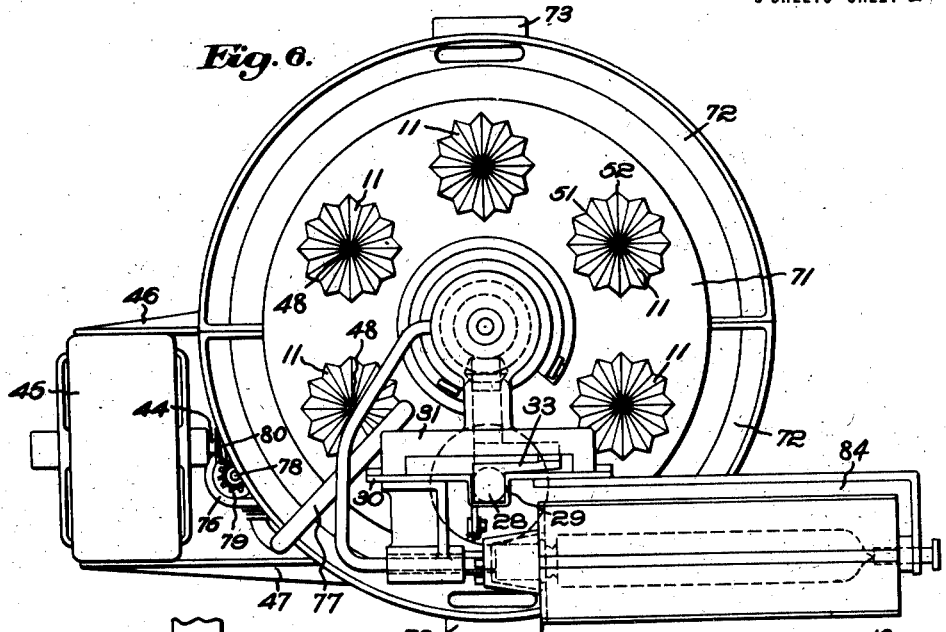
J. C. LIGGETT.
MACHINE FOR EXTRACTING JUICE FROM FRUIT.
APPLICATION FILED MAY 8, 1916.
1,401,416.  Patented Dec. 27, 1921.
3 SHEETS—SHEET 3.
Inventor:
John C. Liggett.

UNITED STATES PATENT OFFICE.

JOHN C. LIGGETT, OF BROOKLINE, MASSACHUSETTS, ASSIGNOR TO JAMES L. DEMOVILLE, OF BOSTON, MASSACHUSETTS.

MACHINE FOR EXTRACTING JUICE FROM FRUIT.

1,401,416.  Specification of Letters Patent.  Patented Dec. 27, 1921.

Application filed May 8, 1916. Serial No. 96,041.

*To all whom it may concern:*

Be it known that I, JOHN C. LIGGETT, a citizen of the United States, and a resident of Brookline, in the county of Norfolk and State of Massachusetts, have invented an Improvement in Machines for Extracting Juice from Fruit, of which the following description, in connection with the accompanying drawings, is a specification, like characters on the drawings representing like parts.

This invention relates to machines for extracting juices from fruits, and more particularly fruits of the citrus class, such as oranges and lemons.

My invention will be best understood by reference to the following description, when taken in connection with the accompanying drawings of one specific embodiment thereof, while its scope will be more particularly pointed out in the appended claims.

In the drawings:

Fig. 2 is a central, vertical section on line 2—2 of Fig. 1, showing the plunger in its elevated position;

Fig. 3 is a partial section, similar to Fig. 2, but showing the plunger in its depressed position;

Fig. 4 is a detail sectional view on an enlarged scale, showing a portion of the clutch mechanism with the clutch disengaged;

Fig. 5 is a sectional view, similar to Fig. 4, showing the clutch engaged;

Fig. 6 is a plan of the machine;

Figure 1:
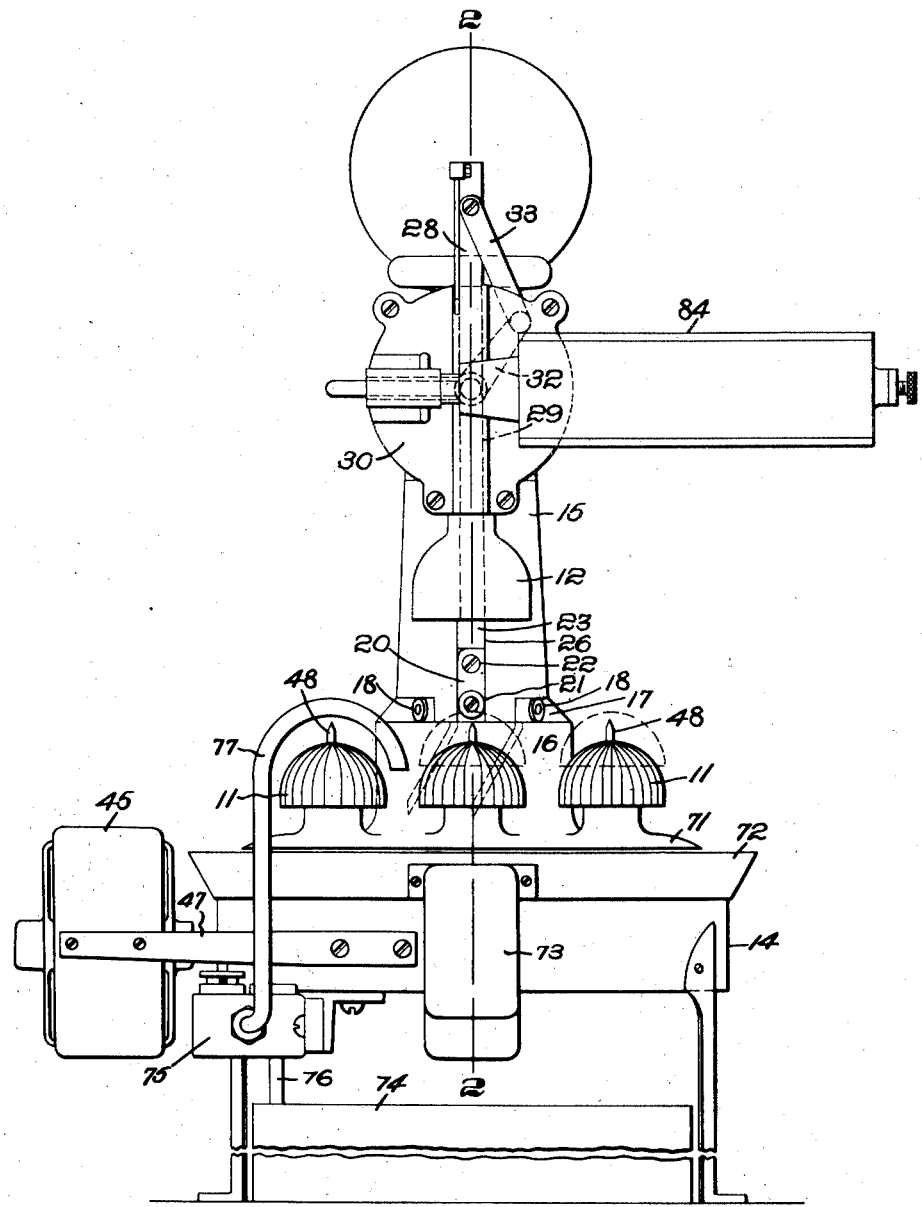
Figure 1 is a front elevation of the machine; that is to say, it is an elevation of the machine as viewed by the observer when the machine is used for exhibition purposes, and is the side opposite to that where the operator stands when feeding the fruit to the machine.

Figs. 7 to 10, inclusive, are detail views on an enlarged scale, illustrating a portion of the turret rotating mechanism in various positions; and Fig. 11 is a detail sectional view of the cup member 12.

Referring to the drawings, and to the embodiment of my invention which I have selected for illustration, I have there shown the preferred embodiment of my invention as adapted for use in squeezing the juices from citrus fruit. In the present example, I have shown a plurality of fruit holders, or carriers, 11, of which there may be any suitable number, according to the requirements, there being six employed in the present instance. These holders are arranged to coöperate one by one with appropriate squeezing means, herein comprising an inverted cup-like member 12. The fruit will be applied to the fruit holders, and the latter presented successively in position for coöperation with the member 12.

Any suitable means may be employed to present the fruit holders or carriers 11 successively in preliminary position preparatory for coöperation with the member 12, and in the present instance, I employ for such purpose a traveling carrier 13 in the form of a turret, preferably arranged to turn about an upright axis. In the present instance, the turret 13 is mounted to rotate on a suitable base 14, on which is mounted a column 15. The turret is herein provided with a hub 16, encircling a column 15, and may be held against axial movement by a collar 17 partially encircling the column. If desired, there may be employed as a means to receive the axial thrust of the hub a plurality of rollers 18, journaled on the collar 17, and arranged in rolling contact with the end of the hub.

Any suitable means may be provided for imparting to the turret 13 a step-by-step rotation, to bring the fruit holders successively in preliminary position preparatory for coöperation with the member 12. To this end, I have herein provided the internal surface of the hub 16 with a series of helical cams 19, corresponding in number to the fruit holders 11. In Figs. 7 to 10, inclusive, I have shown a partial development of the hub 16 in connection with a coöperating dog 20 carrying a roller 21 arranged for coöperation with the cams 19. The dog 20 is pivoted at 22 on a vertically reciprocatory plunger 23, the latter having a shoulder 24 which serves as a stop coöperating with the dog 20 to limit the swinging movement of the latter in one direction, the dog, however, being provided with a rounded corner 25 formed concentric with the pivotal axis of the dog, whereby the latter may swing freely in the opposite direction.

In Fig. 7, I have shown what may be termed the initial or normal position of the plunger 23 and dog 20. The first step in the operation is to cause the plunger to descend from the position shown in Fig. 7 to that shown in Fig. 9, and in so doing, the roller 20 will engage what may be termed the forward edge of one of the cams 19; and, upon further downward movement of the plunger, the dog will be swung in a forward direction, as illustrated in Fig. 8, until it reaches the end of the incline of the cam, whereupon further descent of the plunger will result in the dog being swung by gravity to a vertical position, illustrated in Fig. 9, the roller being now ready for coöperation with the rear edge of the cam. If, now, the plunger be given an upward movement, the roller 21 will engage the rear edge of the cam, and since the dog 20 cannot swing rearwardly, the cam must necessarily be propelled in a forward direction (that is to say, toward the left as viewed in Figs. 7 to 10, inclusive,) in the manner illustrated in Fig. 10, until the roller has reached the upper end of the inclined surface of the cam, whereupon the rotation of the turret will cease, and the dog will be restored to the initial position shown in Fig. 7, ready for coöperation with the next succeeding cam. Thus, it will be seen that the described mechanism constitutes a species of pawl and ratchet mechanism, or, more properly speaking, perhaps, an excellent substitute therefor, capable of smooth operation without shock or jar, and requiring comparatively little expenditure of power in propelling the turret.

Herein, the plunger 23 is in the form of a slide mounted in a suitable guideway, herein in the form of a vertical groove 26 in the column 15, as best shown in Figs. 1 and 2. Any suitable means may be employed to impart a vertical reciprocatory movement to the plunger 23, but herein the latter is connected by a rigid connection 27 to a second plunger 28. The latter is herein mounted in a suitable guideway 29, formed in a cover plate 30 of a casing 31, best shown in Figs. 1 and 2, serving as a housing for a crank 32 connected by a link 33 to the plunger 28, whereby the turning movement of the crank imparts a reciprocatory motion to the plungers 28 and 23.

The crank 32 herein receives its motion from a shaft 34, to which it is secured, said shaft being journaled in a suitable bearing 35 extending from the casing 31 into the interior of a housing 36 forming a portion of the column 15. Within this housing, there is secured to the shaft 34 a bevel gear 37, meshing with a bevel pinion 38, the latter being secured to a shaft 39. This shaft may be conveniently arranged co-axially with reference to the column 15, and mounted in suitable bearings 41. Any suitable mechanism may be employed for rotating the shaft 39, but herein the latter has secured thereto a worm gear 42, meshing with a worm 43 (see Fig. 2). The worm 43 is herein secured to a main driving shaft 44, the latter extending through the base 14 to the exterior of the latter, as best shown in Fig. 6, and may be driven by any suitable means, herein a motor 45 mounted on suitable supports 46 and 47, attached to the base 14.

It will now be apparent that the intermittently rotating turret brings the fruit holders 11 successively into a preliminary position preparatory for coöperation with the member 12. The fruit holders 11 and the coöperating member 12 may be given a form suitable for the particular class of fruits for which the machine is to be used, and herein I have shown them adapted for use in squeezing oranges, which are first cut in halves. To this end, the fruit holders 11 are generally hemispherical in form, and the member 12 similarly hemispherical in form upon its internal surface, and the latter being larger than the external surface of the fruit holder by approximately the thickness of an orange skin, as best shown in Fig. 3. As a means for securing half an orange to each holder, the latter is herein provided with an axially arranged upstanding spur 48. The operator takes a position adjacent the rear of the machine, that is to say, the side opposite to the member 12, and as the fruit holders come within convenient range, impales upon each of the spurs 48 a half orange, so that the latter will appear as indicated in dotted lines in Fig. 1. A rotation of the turret, as before stated, brings the fruit holders one by one into position beneath the member 12. The latter is then caused to descend by any suitable means, herein for that purpose being attached to the plunger 28, whereby the coöperating members 11 and 12 are brought into juxtaposition, as best shown in Fig. 3, thus squeezing the half orange with great force, and causing the expulsion of the juice.

I have found that the squeezing of the oranges is best effected by causing a relative rotation to take place between the two coöperating squeezing members during the squeezing operation. This is preferably accomplished by rotating each of the members 11 after it has been brought into preliminary position for coöperation with the member 12. To this end, each of the fruit holders 11 is secured to a spindle 49 mounted in upright position in a suitable bearing 50 in the turret 13. The external surface of the fruit holder 11 may be suitably formed to abrade the cells and pulp of the orange, the holder to this end being preferably provided with a series of radiating grooves 51 and ribs 52, starting adjacent the axis of the fruit holder—that is to say, adjacent the spur 48, and extending in an outward and downward direction therefrom.

It will now be evident that, if the cup like member 12 be caused to descend from the position shown in Figs. 1 and 2 to the position shown in Fig. 3, the half orange will be forced into the cup-like receptacle, and held thereby against rotation, while the member 11 is forced into the orange and rotated, thus effectively removing practically all the juices. The rotation of the holder 11 may be accomplished by any suitable means, but herein the lower end of its shaft 49 is provided with a ratchet-toothed clutch member 53, arranged for coöperation with a similar clutch member 54. The latter is herein carried by, and telescopes with, a worm gear 55, mounted to rotate upon a stud 56, said worm gear meshing with and driven by the worm 43, hereinbefore described. One or more springs 57 arranged in pockets 58 in the clutch member 54 constantly tend to urge said member into engagement with the clutch member 53. Such engagement is effected at the proper time in the operation of the machine by a clutch lever 59 pivoted at 60, and having a cam roll 61 engaging a suitable cam 62 carried by the worm gear 42 hereinbefore described. The clutch lever 59 is provided with a suitable yoke 63, having a tongue or tongues 64, engaging a circumferential groove 65 in the clutch member 54, whereby the latter may be caused to follow the movement of the lever imparted thereto by the cam. It will be understood that the rotation of the turret brings the shafts 49 one by one into axial alinement with the member 12, as well as with the clutch member 54, and when so positioned, the cam 62 is properly timed to cause the clutch member 54 to engage the clutch member 53 and drive the latter, thus rotating the shaft 49 and the fruit holder 11 carried thereby. When the squeezing operation is completed, the clutch is disengaged, and the rotation of the turret brings a second clutch member 53 into position for coöperation with the clutch member 54 and so on.

As a means for expelling the empty orange skins from the cup-like member 12, the latter is herein provided with a suitable ejector 66 having a hollow stem 67 to receive the spur 48. The stem 67 is herein mounted to slide in an axial bore 68 in the lower end of the plunger 28, and there is provided a suitable spring 69, tending to move the ejector in a downward direction, its movement being limited by a suitable stop 70.

As a means for disposing of the juices squeezed from the oranges, the upper surface of the turret 13 is downwardly inclined toward its periphery, and is provided with a marginal portion, or ledge, 71, which overhangs a ring-like trough 72. In the present embodiment, this trough, as best shown in Fig. 6, is made in two district halves, quite separate and independent one from the other. For convenience in assembling and disassembling, these two parts of the trough are supported upon the base 14, in position to receive the drippings from the overhanging margin of the turret, and, if desired, may be provided with discharge conduits 70 73, best shown in Fig. 2. These conduits have their discharging ends directed inwardly and downwardly, and may discharge into a suitable container 74.

If desired, water may be added to the juice in the container 74, and the solution may be circulated by a suitable pump 75, having an intake 76 leading from the container 74, and a discharge conduit 77 whose outlet is so disposed as to discharge the solution upon the holders and the turret as the latter is rotated. By this means, a continual washing process is carried on, and accumulations of the orange pulp and cells upon the fruit holders and turret prevented.

The pump 75 may be of any suitable type, but I prefer to employ what is commonly known as a gear pump, which I have deemed it unnecessary to illustrate or describe in detail, said pump having a shaft 78 driven by appropriate mechanism connected with the motor 45, there being employed in the present instance for this purpose a worm gear 79 secured to the shaft 78, and meshing with a worm 80 secured to the main driving shaft 44.

If desired, the machine may be equipped with a suitable lamp 81, herein an electric lamp receiving its current through wires 82 carried through a conduit 83 extending from the base of the machine through the column. The machine may be equipped also with an advertising device 84, which it will be unnecessary to describe, since it forms no part of my present invention.

Having thus described my invention, what I claim and desire by Letters Patent to secure is:

1. In a machine for extracting juices from fruit, the combination of a plurality of fruit carriers, each of said carriers being provided with a spur upon which the fruit may be impaled and retained in proper position thereon, means to coöperate with each of said carriers to extract juices from the fruit, and means to present said carriers successively in position for coöperation with the first-mentioned means.

2. In a machine for extracting juices from fruit, the combination of a plurality of fruit carriers, means to coöperate with each of said carriers to extract juices from the fruit, a suitable receptacle for the juices, means for conducting the juices toward said receptacle, and means for drawing juices from said receptacle and discharging the same onto said carriers, and means to present said carriers successively in position for coöperation with the first-mentioned means.

3. In a machine for extracting juices from fruit, the combination of a plurality of fruit carriers, means to coöperate with each of said carriers to squeeze the fruit, means to present said carriers successively in position for coöperation with the first-mentioned means, and means including a clutch for rotating each carrier while thus positioned.

4. In a machine for extracting juices from fruit, the combination of a plurality of fruit carriers, means to coöperate with each of said carriers to squeeze the fruit, means to present said carriers successively in position for coöperation with the first-mentioned means, and means including a plurality of clutch members one carried by each carrier and another clutch member coöperating successively therewith for rotating each carrier while thus positioned.

5. In a machine for extracting juices from fruit, the combination of a rotatable turret, a plurality of rotatable fruit carriers carried thereby, means to coöperate with each of said carriers to extract juices from the fruit, means for rotating said turret to bring said carriers successively into position preparatory for coöperation with the first-mentioned means, means to cause the first-mentioned means to coöperate with said carriers one by one, and means for rotating each of said carriers during such coöperation.

6. In a machine for extracting juices from citrus fruit and the like, the combination of a base, a turret rotatably mounted thereon, a hollow column extending from said base upward through said turret and provided with a guideway, a plurality of fruit carriers of generally hemispherical shape and having shafts whose axes are generally parallel with the axis of said turret, a cup-like member to coöperate with each of said carriers to squeeze the fruit thereon, a slide mounted for reciprocation in said guideway and serving as a support for said cup-like member, a shaft within said column, mechanism driven by said shaft for reciprocating said slide, mechanism operated by said slide for imparting to said turret a step-by-step rotation to bring said carriers one by one into position preparatory for coöperation with said cup-like member, and mechanism connected with said shaft for rotating each carrier when so positioned, the last-mentioned mechanism including a plurality of clutch members, one carried by each of said carrier shafts, another clutch member arranged for coöperation with said plurality of clutch members one at a time, and means for causing proper engagement and disengagement of said clutch members in timed relation with said turret and said cup-like member.

7. In a machine for extracting juices from citrus fruit and the like, the combination of a base, a turret rotatably mounted thereon, a hollow column extending from said base upward through said turret and provided with a guideway, a plurality of fruit carriers of generally hemispherical shape and having shafts whose axes are generally parallel with the axis of said turret, a cup-like member to coöperate with each of said carriers to squeeze the fruit thereon, a slide mounted for reciprocation in said guideway and serving as a support for said cup-like member, a shaft within said column, mechanism driven by said shaft for reciprocating said slide, mechanism operated by said slide for imparting to said turret a step-by-step rotation to bring said carriers one by one into position preparatory for coöperation with said cup-like member, mechanism connected with said shaft for rotating each carrier when so positioned, means for receiving the juices squeezed from said fruit, and means for discharging a stream of said juices onto said carriers between their periods of coöperation with said member.

8. In a machine for extracting juices from fruit, the combination of a cup-like fruit-receiving device, a plurality of fruit holding and carrying devices, means to present said holding and carrying devices, each with its fruit, successively in a preliminary position preparatory for coöperation with said fruit-receiving device, and means to cause said fruit-receiving device to receive in succession the fruit thus presented and to coöperate with each holding and carrying device to extract the juices from the fruit held thereby.

9. In a machine of the class described, a traveling carrier, a plurality of convex members thereon, impaling points on said members, a corresponding concave member adjacent the path of the carrier and means to press the same against successive convex members as they are presented adjacent thereto.

10. In a machine of the class described, a traveling carrier, a plurality of convex members thereon, impaling points on said members, a corresponding concave member adjacent the path of the carrier, means to press the same against successive convex members as they are presented adjacent thereto and a displaceable ejecting plunger in said concave member automatically operated after the release of the pressure.

11. In a machine of the class described, a traveling carrier having a convex surface to shed liquid therefrom, fruit receivers on said carrier, a coöperating squeezer member above said carrier and arranged to act successively in conjunction with each receiver and means to receive expressed liquid from the convex surface of the carrier.

12. In a machine of the class described, a substantially horizontal convex member having a series of fruit receivers thereon, an annular trough about the edge of said member, a squeezing device, and driving means effecting coöperation of the squeezing device with each receiver successively.

13. In a machine for extracting juices from citrus fruit and the like, the combination of a base, a turret rotatably mounted thereon, a hollow column extending from said base upward through said turret and provided with a guideway, a plurality of fruit-carriers of generally hemispherical shape and having shafts whose axes are generally parallel with the axis of said turret, a cup-like member to coöperate with each of said carriers to squeeze the fruit thereon, a slide mounted for reciprocation in said guideway and serving as a support for said cup-like member, a shaft within said column, mechanism driven by said shaft for reciprocating said slide, mechanism operated by said slide for imparting to said turret a step-by-step rotation to bring said carriers one by one into position preparatory for coöperation with said cup-like member, and mechanism connected with said shaft for rotating each carrier.

In testimony whereof, I have signed my name to this specification.

JOHN C. LIGGETT.